United States Patent
Gu et al.

(10) Patent No.: US 6,594,680 B1
(45) Date of Patent: Jul. 15, 2003

(54) PSUEDO-RANDOM NOISE SEQUENCE GENERATING SYSTEM

(75) Inventors: Zhenguo Gu, Plano, TX (US); Yuan Kang Lee, Richardson, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/475,932

(22) Filed: Dec. 30, 1999

(51) Int. Cl.[7] .............................................. G06F 1/02
(52) U.S. Cl. ..................................... 708/256; 708/252
(58) Field of Search .............................. 708/256, 252

(56) References Cited

U.S. PATENT DOCUMENTS

| | | | |
|---|---|---|---|
| 5,228,054 A | | 7/1993 | Rueth et al. .................... 375/1 |
| 5,444,645 A | * | 8/1995 | Yoshida et al. .............. 708/256 |
| 5,519,736 A | * | 5/1996 | Ishida .......................... 331/78 |
| 5,532,695 A | * | 7/1996 | Park et al. .................... 341/173 |
| 5,566,099 A | * | 10/1996 | Shimada ....................... 331/78 |
| 6,339,781 B1 | * | 1/2002 | Sasaki ......................... 708/250 |

* cited by examiner

*Primary Examiner*—David H. Malzahn
(74) *Attorney, Agent, or Firm*—Ronald O. Neerings; Wade James Brady, III; Frederick J. Telecky, Jr.

(57) ABSTRACT

Multiple PN sequences are generated in parallel using multiple LFSRs (10) or multiple mask circuits (40) coupled to a single LFSR. The offsets between PN sequences can be individually and independently set, either by setting the initial state in an LFSR (10) or setting a mask vector in a mask circuit (40). The LFSRs can be configured in real time to produce one or more blocks of PN sequence bits or to produce disjoint PN sequence bits. Zero insertion may be automatically generated in the LFSRs without additional mask circuitry. PN generating circuits may use either relative or absolute addressing, and may accommodate two levels of relative addressing. Further, one embodiment provides relative addressing without using masks.

20 Claims, 2 Drawing Sheets

PSUEDO-RANDOM NOISE SEQUENCE GENERATING SYSTEM

CROSS-REFERENCE TO RELATED APPLICATIONS

Not Applicable

STATEMENT OF FEDERALLY SPONSORED RESEARCH OR DEVELOPMENT

Not Applicable

BACKGROUND OF THE INVENTION

1. Technical Field

This invention relates in general to communications and, more particularly, to pseudo-random noise sequence generating system.

2. Description of the Related Art

Present code division multiple access (CDMA) systems are characterized by simultaneous transmission of different data signals over a common channel by assigning each signal a unique code. This unique code is matched with a code of a selected receiver to determine the proper recipient of a data signal. Base stations in adjacent cells or transmit areas also have a unique pseudorandom noise (PN) code associated with transmitted data. This PN code is typically generated by a linear feedback shift register (LFSR), also known as a linear sequence shift register (LSSR), and enables mobile stations within the cell to distinguish between intended signals and interference signals. Identification of a PN code requires that the mobile station correctly identify an arbitrary part of the received PN sequence. The identification is frequently accomplished by a correlation of a locally generated PN sequence with the PN sequence received from the base station. The sliding window algorithm often requires the mobile station to efficiently calculate multiple offsets from the LFSR to match the received sequence.

Therefore, a need has arisen for a circuit that can quickly generate multiple offsets in a PN sequence without complex circuitry.

BRIEF SUMMARY OF THE INVENTION

In the present invention, a pseudorandom noise sequence generator is provided with circuitry for generating multiple PN sequences in parallel and circuitry for individually setting offsets between said multiple PN sequences in real time.

The present invention provides significant advantages over the prior art. First, multiple PN sequences with different offsets (relative or absolute) can be generated with respect to a reference system time in a manner of centralized control in applications such as IS-95A/B and/or WCDMA systems. In addition, zero-insertion is supported for lengthening PN sequences by one, which is a requirement for IS-95 standards. In WCDMA (Wide CDMA), the PN generating system can be used for generation of Gold sequences and Kasami sequences. Thus, a single system can support multiple standards.

BRIEF DESCRIPTION OF THE SEVERAL VIEWS OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

The present invention is best understood-in relation to FIGS. 1–4 of the drawings, like numerals being used-for like elements of the various drawings.

Figure 1:
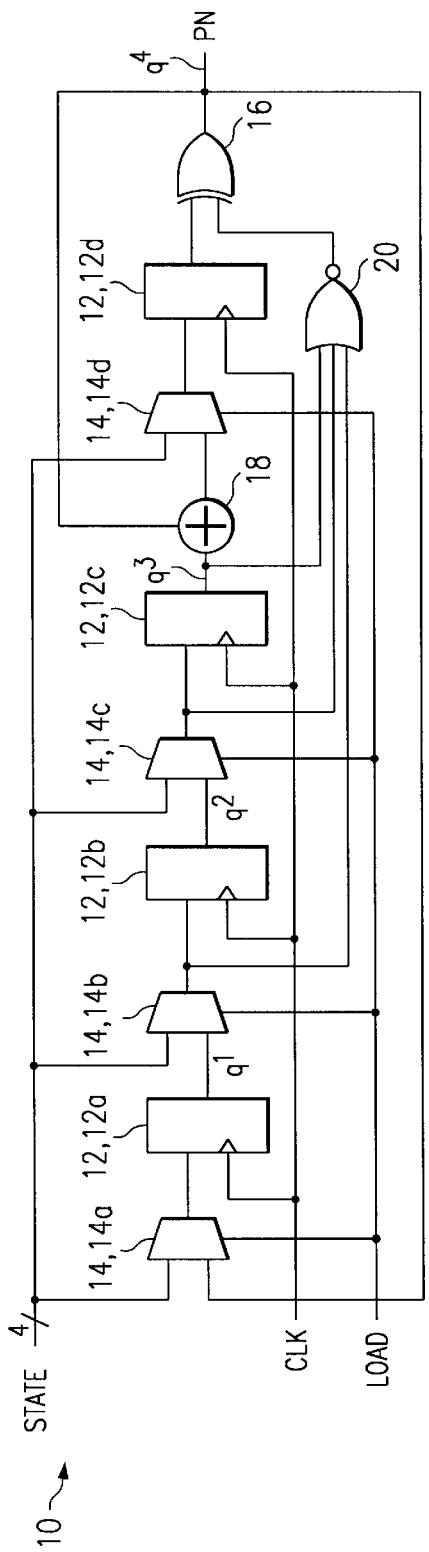
FIG. 1 illustrates a LFSR with automatic zero insertion.

FIG. 1 illustrates a prior art four stage LFSR 10 (in Galois form) with zero insertion circuitry for generating a pseudo-random noise sequence. In many applications, the pseudo-random noise sequence would be generated by a much longer LFSR; LFSR having as many as forty stages are not uncommon. In the illustrated LFSR circuit, a clock signal is used to clock delay flip-flops 12 (individually referenced as 12a–12d). The input of each flip-flop 12 is coupled to the output of a respective multiplexer 14 (individually referenced as 14a–14d). One of the-inputs to each multiplexer is a "state" signal for loading a desired state into the flip-flops 12 of the LFSR 10. For multiplexer 14a, the other input is q4, the output of exclusive-or gate 16 (which is also the PN sequence output of the LFSR 10). The second input to-multiplexer 16b is the output of flip-flop 12a (q1), the second input to multiplexer 16c is the output of flip-flop 12b (q2). The output of flip-flop 12c (q3) is coupled to the first input of an-exclusive-or gate 18, the second input of exclusive-or gate 18 is coupled to the output of exclusive-or gate 16. The output of exclusive-or gate 18 is coupled to the second input to multiplexer 14d. The output of multiplexer 12d is coupled to a first input of exclusive-or gate 16, the output of a three input NOR gate 20 is coupled to the second input of exclusive-or gate 16. The inputs to NOR gate 20 are the outputs of multiplexers 12a, 12b and 12c.

Table 1 illustrates the sequence of bits from LFSR 10, starting from an arbitrary starting state of "0001".

| State (N) | q1 | q2 | q3 | q4 |
|---|---|---|---|---|
| 1 | 0 | 0 | 0 | 1 |
| 2 | 1 | 0 | 0 | 1 |
| 3 | 1 | 1 | 0 | 1 |
| 4 | 1 | 1 | 1 | 1 |
| 5 | 1 | 1 | 1 | 0 |
| 6 | 0 | 1 | 1 | 1 |
| 7 | 1 | 0 | 1 | 0 |
| 8 | 0 | 1 | 0 | 1 |
| 9 | 1 | 0 | 1 | 1 |
| 10 | 1 | 1 | 0 | 0 |
| 11 | 0 | 1 | 1 | 0 |
| 12 | 0 | 0 | 1 | 1 |
| 13 | 1 | 0 | 0 | 0 |
| 14 | 0 | 1 | 0 | 0 |
| 15 | 0 | 0 | 1 | 0 |
| 0 - Zero insertion state | 0 | 0 | 0 | 0 |
| 1 | 0 | 0 | 0 | 1 |

Accordingly, the output of the LFSR 10, using the starting state of "0001", is "1111010110010000 . . . " which will repeat indefinitely. The PN sequence from a given LFSR will vary depending upon the polynomial, i.e., upon which of the intermediate outputs (q1–q3) is connected to an exclusive-or gate 18 along with the output of the LFSR (q4). For example, if q2 and q4 were coupled to the exclusive-or gate 18 (with the output of exclusive-or gate 18 coupled to the input of multiplexer 14c), the polynomial for the output sequence would change. With zero insertion, provided automatically by NOR gate 20, the output PN sequence of a 40-stage LFSR would repeat every $2^{40}$ bits (or "chips").

NOR gate 20 detects when outputs q1 through q3 are set to "0". In this case, NOR gate 20 outputs a logical "1", which forces q4 to "0" if the output of flip-flop 12d is a logical "1". In the next clock cycle after a zero insertion, q4 will be forced to a logical "1" by NOR gate 20 and exclusive-or gate 16.

One advantage of the LSFR 10 is that is automatically recovers from an initial zero state (i.e., "0000").

Without zero insertion (i.e., by eliminating NOR gate 20 and exclusive-or gate 16), the output of LFSR 10 is shown in Table 2.

| State (N) | q1 | q2 | q3 | q4 |
|---|---|---|---|---|
| 1 | 0 | 0 | 0 | 1 |
| 2 | 1 | 0 | 0 | 1 |
| 3 | 1 | 1 | 0 | 1 |
| 4 | 1 | 1 | 1 | 1 |
| 5 | 1 | 1 | 1 | 0 |
| 6 | 0 | 1 | 1 | 1 |
| 7 | 1 | 0 | 1 | 0 |
| 8 | 0 | 1 | 0 | 1 |
| 9 | 1 | 0 | 1 | 1 |
| 10 | 1 | 1 | 0 | 0 |
| 11 | 0 | 1 | 1 | 0 |
| 12 | 0 | 0 | 1 | 1 |
| 13 | 1 | 0 | 0 | 0 |
| 14 | 0 | 1 | 0 | 0 |
| 15 | 0 | 0 | 1 | 0 |
| 1 | 0 | 0 | 0 | 1 |

For the non-zero-insertion case, it can be seen that $q1[n+1]=q4[n]$ $q2[n+1]=q1[n]$ $q3[n+1]=q2[n]$ $q4[n+1]=q3[n]\oplus q4[n]$, where $\oplus$ designates an exclusive-or operation or, equivalently, modulo two addition.

These equations can be placed into state transition-matrix form:

$s[n+1]=T\,s[n]$ or $$\begin{bmatrix} q1[n+1] \\ q2[n+1] \\ q3[n+1] \\ q4[n+1] \end{bmatrix} = \begin{bmatrix} 0001 \\ 1000 \\ 0100 \\ 0011 \end{bmatrix} \begin{bmatrix} q1[n] \\ q2[n] \\ q3[n] \\ q4[n] \end{bmatrix}$$

An offset from a known state s[n] can be calculated using repeated application of the T matrix. Using the state calculations described above, $s[n+2]=T\,(T\,s[n])$, $s[n+3]=T\,(T\,(T\,s[n]))$, and so on. Thus, to move j states ahead in time from a starting state s[n], $s[n+j]=T^{j}\,s[n]$). An efficient method of calculating $T^{j}$ is provided in U.S. Ser. No. 09/222,454 to Gu, entitled "State Calculation Circuit for Discrete Linear State Space Model", filed Dec. 29, 1998, now U.S. Pat. No. 6,173,009 assigned to TEXAS INSTRUMENTS INCORPORATED, which is incorporated by reference herein. A transition matrix for an LFSR in Fibonnaci form is described in connection with U.S. Ser. No. 09/404,082, entitled "Block Pseudo-Noise Generating Circuit" to Brown et al, filed Sep. 23, 1999, now U.S. Pat. No. 6,282,230 assigned to TEXAS INSTRUMENTS INCORPORATED, which is also incorporated by reference herein.

It is a significant advantage that a state can be calculated in real time for any given offset using the technique described above.

Accordingly, a relative jump (or offset) to a new state from a current state can be accomplished by applying $T^{j}$ to the current state s[n], where j is the offset. An absolute jump to a known index can be accomplished by applying $T^{j}$ to an starting state s[1]. Depending upon the application, absolute addressing may be more efficient for zero insertion PN generation and relative addressing may be better for the long PN state calculation in IS-95 standards.

Figure 2:
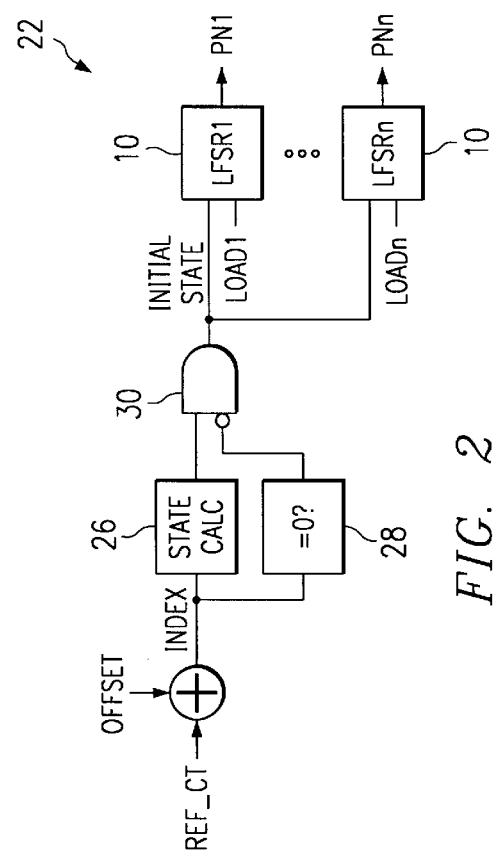
FIG. 2 illustrates an absolute addressing, multiple PN sequence generator.
Figure 3:
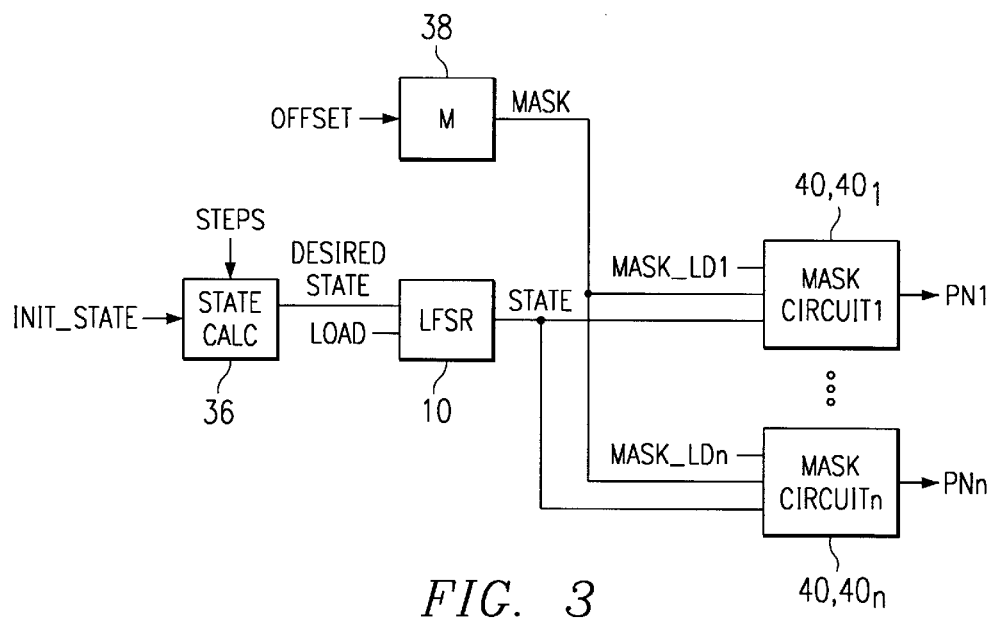
FIG. 3 illustrates a first embodiment of a relative-addressing, multiple PN sequence generator.
Figure 4:
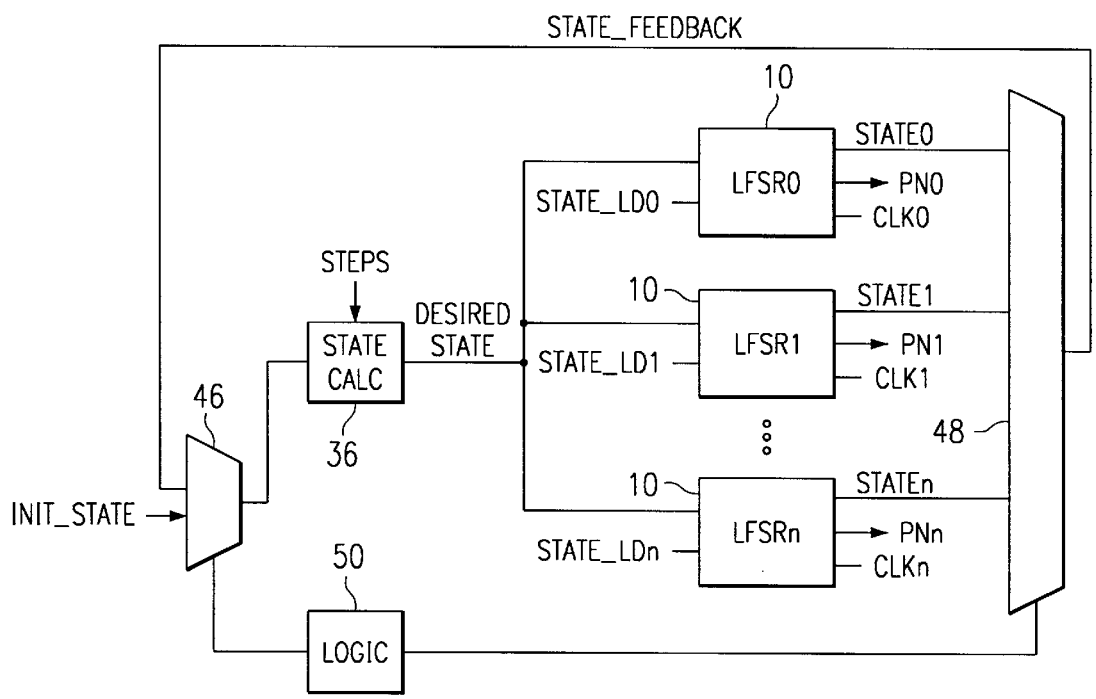
FIG. 4 illustrates a second embodiment of a relative addressing, multiple PN sequence generator.

As shown in FIGS. 2, 3, and 4, the LFSR 10 can be loaded to any desired state by applying the state bits to respective flip-flops 12 and enabling the LOAD signal.

FIG. 2 illustrates a block diagram of a PN generator 22 with a zero insertion function for absolute addressing. A reference count (REF_CT) is added to an offset (OFFSET) to generate an absolute index (INDEX) in the PN sequence. INDEX is coupled to a state calculator 26 that calculates a transition matrix T and applies it to a starting state to generate the state s[INDEX]. INDEX is also input to comparator 28, which outputs a logical "0" if INDEX="0". The output of state calculator 26 is connected to four (for a four stage LFSR) AND gates 30, along with the output of comparator 28, such that each AND gate 30 is coupled to a respective bit of the state from state calculator 26 and to the output of comparator 28. The output of AND circuit 30 is coupled to a plurality of LFSRs 10 (individually shown as LFSR1 through LFSRn), each with an independently controllable load signal (LOAD1 through LOADn). Each LFSR outputs a PN sequence (PN1 through PNn).

In operation, the state calculator generates the state at s[INDEX]. If INDEX=0, comparator 28 forces the output of AND circuitry 30 to be all zeros. Otherwise, the output of AND circuitry 30 is the same as the output of the state calculator 26. The outtput of AND circuitry 30 is labeled "INITIAL STATE". This state can be loaded into any one or more of the LFSRs 10. Hence, by generating multiple INDEXs, different states can be loaded into each of the LFSRs by enabling the LOAD signal for the LFSR. The LFSRs can implement the same or different polynomials (corresponding transition matrices would be needed to accommodate multiple polynomials).

Once a LFSR 10 is loaded with INITIAL STATE, the LFSR 10 automatically handles the zero insertion function, as described in connection with FIG. 1. Accordingly, complicated mask control circuitry is not needed to accommodate zero insertion.

Further, the different LFSRs can be loaded with different states to provide PN sequences with different offsets. One application would be to set the LFSRs with initial states that were offset by one, such that the output of the n LFSRs 10 would be $PN_{k}$, $PN_{k+1}$, $PN_{k+2}$, . . . , $PN_{k+n}$. This would provide a n bit block of consecutive PN sequence bits without any mask circuitry or mask calculation. Another example would be to set the LFSR to initial states to provide multiple blocks of PN sequence bits, for example, $PN_k$, $PN_{k+1}$, $PN_{k+2}$, $PN_{k+3}$, $PN_m$, $PN_{m+1}$, $PN_{m+2}$ and $PN_{m+3}$. Alternatively, the LFSRs could be loaded with initial states to provide disjoint PN sequences. Changes to the relative offsets between LFSRs 10 could be made in real time.

The circuit of FIG. 2 could also be implemented without the zero insertion circuitry for applications where zero insertion is not used.

FIG. 3 illustrates a relative addressing PN generator 34 with two levels of relative addressing. In this embodiment, the state calculator 36 receives an initial state (INIT_STATE) and a STEP parameter that indicates the number of steps to reach the desired state from the initial state. Based on the number of steps, the state calculator generates a transition matrix T in real time to compute the desired statefrom the initial state, as described above. The desired state is loaded into the LFSR 10 responsive to the LOAD signal. An OFFSET signal is input to a mask calculator 38. The mask calculator 38 generates a mask for producing an offset relative to the state in the LFSR 10. The masks generated by mask calculator 38 can be stored individually in mask circuits 40 (individually referenced as mask circuits $40_1$ through $40_n$. Mask circuits 40 receive the state from LFSR 10.

The mask circuits 40 are dot product operators in the modulo 2 sense. In general, the mask calculation circuit 38 calculates $m_x = m_0 T^x$, where $m_0$ is a mask vector which provides the last bit of a 1xp state vector, i.e., $m_0 = [00 \ldots 01]$, $m_x$ provides an offset of x bits, and $T^x$ is the transition matrix describe above, raised to the xth power.

In operation, each mask circuit 40 can load a mask from mask calculator 38 independently from the other mask circuits. Hence, mask circuit $40_1$ could have a $m_1$ mask which produces a PN sequence with a relative offset one from the current state of the LFSR 10, while mask circuit $40_2$ could have a $m_2$ mask which produces a PN sequence with a relative offset two from the current state of the LFSRK 10. The state of LFSR 10 can be loaded at any time with a new desired state and any of the mask circuits can be loaded at any time with a new mask from mask calculator 38. This circuit provides two levels of relative addressing one—level associated with the STEP parameter and the other level associated with the OFFSET parameter.

As in FIG. 2, the output of the mask circuits can be one or more consecutive PN sequence blocks or disjoint individual PN bits.

FIG. 4 illustrates another relative addressing PN generator circuit 44, which does not need mask circuits to perform the relative addressing. State calculator 36 receives an initial state from multiplexer 46; the initial state can be either a presented state (INIT_STATE) or can be a state from one of n+1 LFSRs 10, via multiplexer 48 (STATE_FEEDBACK), controlled by logic 50. A desired state is calculated from the state input to the state calculator 36 and a STEPS parameter, as described in connection with FIG. 3. The output of state calculator 36 can be loaded into any of the LFSRs 10, responsive to a STATE_LD signal. In one embodiment, the LFSRs are independently clocked, such that their PN sequence outputs may be in different time domains, if desired.

In operation, each LFSR 10 may be loaded with a different desired state from state calculator 36. The current state of any of the LFSRs can be used to generate an initial state (along with the STEPS parameter) for the other LFSRs in the circuit.

Each of the circuits shown in FIGS. 2 through 4 is capable of parallel processing of multiple PN sequences. The offsets for each sequence may be set independent of the other sequences. The offset version of the PN sequences can be either absolute (FIG. 2) or relative (FIGS. 3 and 4).

The present invention provides significant advantages over the prior art. First, multiple PN sequences with different offsets (relative or absolute) can be generated with respect to a reference system time in a manner of centralized control in applications such as Is-95 A/B and/or WCDMA systems. Second, the PN state calculator is embedded in the circuitry an can obtain the PN states in real time, so that the state for a PN sequence can be loaded at any timer for any given offset. In addition, zero insertion is supported for lengthening PN sequences by one, which is a requirement for IS-95 standards. In WCDMA, the PN generating system can be used for generation of Gold sequences and Kasami sequences. Thus, a single system can support multiple standards.

Although the Detailed Description of the invention has been directed to certain exemplary embodiments, various modifications of these embodiments, as well as alternative embodiments, will be suggested to those skilled in the art. The invention encompasses any modifications or alternative embodiments that fall within the scope of the claims.

What is claimed is:

1. A pseudorandom noise sequence generator comprising:
   circuitry for generating multiple PN sequences in parallel; and
   circuitry for individually calculating and setting arbitrary offsets between said multiple PN sequences in real time.

2. The pseudorandom noise sequence generator of claim 1 wherein said generating circuitry comprises a plurality of linear feedback shift registers.

3. The pseudorandom noise sequence generator of claim 2 wherein said circuitry for individually setting offsets comprises circuitry for generating a state and loading said state into a selected linear feedback shift register.

4. The pseudorandom noise sequence generator of claim 3 wherein said circuitry for generating a state comprises circuitry for applying a transition matrix to a known state responsive to a desired offset.

5. The pseudorandom noise sequence generator of claim 3 wherein said circuitry for individually calculating and setting arbitrary offsets comprises:
   circuitry for selecting a current state of a selected linear feedback shift register as an initial state; and
   circuitry for generating offsets for the linear feedback shift registers relative to said initial state.

6. The pseudorandom noise sequence generator of claim 1 wherein said generating circuitry comprises:
   a linear feedback shift register; and
   plurality of mask circuits having respective mask vectors for applying to a current state vector of said linear feedback shift register.

7. The pseudorandom noise sequence generator of claim 6 wherein said mask circuits comprise dot product calculators.

8. The pseudorandom noise sequence generator of claim 6 wherein said circuitry for individually setting offsets comprises circuitry for generating a mask vector responsive to a desired offset and loading said mask vector into one of said mask circuits.

9. The pseudorandom noise sequence generator of claim 6 wherein said circuitry for individually setting offsets further comprises circuitry for generating a state and loading said state into said linear feedback shift register.

10. The pseudorandom noise sequence generator of claim 8 wherein said circuitry for generating a state comprises circuitry for applying a transition matrix to a known state responsive to a desired offset.

11. A method of generating one or more pseudorandom noise sequences, comprising the steps of:

generating multiple PN sequences in parallel; and individually calculating and setting arbitrary offsets between said multiple PN sequences in real time.

12. The method of claim 11 wherein said generating circuitry comprises a plurality of linear feedback shift registers.

13. The method of claim 11 wherein said step of indvidually setting offsets comprises the steps of generating a state and loading said state into a selected linear feedback shift register.

14. The method of claim 13 wherein said step of generating a state comprises the step of applying a tranisition matrix to a known state responsive to a desired offset.

15. The method of claim 13 wherein said step of individually calculating and setting arbitrary offsets comprises the steps of:

selecting a current state of a selected linear feedback shift register as an initial state; and generating offsets for the linear feedback shift registers relative to said initial state.

16. The method of claim 11 wherein said generating step comprises the steps of:

generating a pseudorandom noise sequence with a linear feedback shift register; and applying a plurality of mask circuits having respective mask vectors to a current state vector of said linear feedback shift register.

17. The method of claim 16 wherein said mask circuits comprise dot product calculators.

18. The method of claim 16 wherein said step of individually setting offsets comprises the steps of generating a mask vector responsive to a desired offset and loading said mask vector into one of said mask circuits.

19. The method of claim 16 wherein said step of individually setting offsets further comprises the steps of generating a state and loading said state into said linear feedback shift register.

20. The method of claim 19 wherein said step of generating a state comprises the step of applying a transition matrix to a known state responsive to a desired offset.

* * * * *